US007197720B2

(12) United States Patent
Lehman

(10) Patent No.: US 7,197,720 B2
(45) Date of Patent: Mar. 27, 2007

(54) INTERACTIVE INVENTOR'S MENUS WITHIN A SOFTWARE COMPUTER AND VIDEO DISPLAY SYSTEM

(76) Inventor: James A. Lehman, P.O. Box 373, Fond du Lac, WI (US) 54936

( * ) Notice: Subject to any disclaimer, the term of this patent is extended or adjusted under 35 U.S.C. 154(b) by 787 days.

(21) Appl. No.: 10/338,968

(22) Filed: Jan. 10, 2003

(65) Prior Publication Data
US 2004/0135809 A1 Jul. 15, 2004

Related U.S. Application Data

(63) Continuation of application No. 09/728,370, filed on Dec. 4, 2000, now abandoned.

(51) Int. Cl.
*G06F 3/00* (2006.01)
*G06F 3/14* (2006.01)
*G06F 17/00* (2006.01)

(52) U.S. Cl. ............ 715/810; 715/733; 715/738; 715/764; 715/835; 715/501.1

(58) Field of Classification Search ............ 715/700, 715/733, 738, 764, 765, 769, 780, 810, 835, 715/841, 843, 846, 866, 501.1
See application file for complete search history.

(56) References Cited

U.S. PATENT DOCUMENTS 6,519,588 B1    2/2003  Leschner
6,965,816 B2 *  11/2005 Walker ................... 701/16
2003/0074671 A1 * 4/2003  Murakami et al. ........ 725/109
2003/0197736 A1 * 10/2003 Murphy .................. 345/780
2003/0208472 A1 * 11/2003 Pham ..................... 707/2
2004/0049728 A1 *  3/2004 Langford ................ 715/501.1
2005/0096761 A1 *  5/2005 Hanover et al. .......... 700/92
2005/0289524 A1 * 12/2005 McGinnes ............... 717/140

OTHER PUBLICATIONS

Lehman, J., "Invendex Inventors Index™," WLC Publishing, Sheboygan, WI (1993).
Wright, C.M., "Imagineering the Future of the Internet: Sketches from the Year 2010," Bulletin of the American Society for Information Science, V. 25, No. 4, pp. 1-7 (Apr./May 1999).

* cited by examiner

*Primary Examiner*—Lucila X. Bautista
(74) *Attorney, Agent, or Firm*—DLA Piper US LLP

(57) ABSTRACT

An interactive menu apparatus and method within a software computer video display system for creating inventions or prospects for inventions, via the juxtaposition of concepts or words, defined from word paths or sets displayed on the menu, from one to six simulated spun reels or drums below the menu, seen through one to thirty open spaces, cells or windows on the menu. In the preferred embodiment, the INVENTOR'S MENU TTT t.m, nine space grid, is utilized.

17 Claims, 12 Drawing Sheets

Application of the Style 2. Inventor's menu to the screen of a conventional desktop computer having Internet art (religious symbols) and typing in what you see as the key word "Christian Cross" for example.

\* OPTION, STAGGARD

APPLICATION OF THE STYLE 1 INVENTOR'S MENU TO THE SCREEN OF A CONVENTIONAL DESKTOP COMPUTER HAVING INTERNET ART.

IN THIS CASE, BASKETBALL MAD- NESS (OR CHRISTMAS CARDS) MAY BE TYPED IN AS AN INTERESTING KEY WORD TO WORK WITH.

(a)

(b)

(c)

(d)

(e)

(f)

(a)

(b)

(c)

(d)

| T | INVENTOR'S MENU TTT ™ | K | © 1987-2002, JAMES A. LEHMAN | R | T |
|---|---|---|---|---|---|
| SITTER | | CHEESEHEAD | | VISOR | |
| SIX GUN | | CHEESEHEAD | | VITAMIN | |
| SIX PACK | | CHEESEHEAD | | VODKA | |

(a)

| F | Inventor's Menu TTT  t.m. | K | © 1987-2002, James A. Lehman | R | T |
|---|---|---|---|---|---|
| INFANT | | TORNADO | | RATTLE SNAKE | |
| INFLAMMABLE | | CHEESEHEAD | | RAVIOLI | |
| INFLATABLE | | TORTILLA | | RAY | |

INTERACTIVE INVENTOR'S MENUS WITHIN A SOFTWARE COMPUTER AND VIDEO DISPLAY SYSTEM

CROSS REFERENCE TO RELATED APPLICATIONS

This application is a continuation and improvement of U.S. application Ser. No. 09/728,370, filing date: Dec. 4, 2000 now abandoned, and claims priority to U.S. application Ser. No. 09/910,608, filed Jul. 23, 2001, the entire contents of which are hereby incorporated by reference. The earlier filing date of this application is hereby claimed.

Three Disclosure Documents (See MPEP § 1706), relative to the three models of the instant invention, have been filed with the Patent and Trademark Office:

Model 1, the Inventor's Menu, filed Jun. 6, 2002, document number 512932.

Model 2, the Inventor's Menu TTT, filed May 14, 2002 document number 511528.

and, Model 3, for Inventor's Menu, Maxi and Mini, filed Aug. 16, 2002 document number 516628.

BACKGROUND OF THE INVENTION

1. Field of the Invention

Menus of various types are used in computer software. These menus display configurations, cells, windows and icons of all sorts for any number of different purposes but, to date, no such menu has been developed for the specific purpose of inventing via a menu and apparatus within a software computer and video display system—which, in this case is capable of utilizing any word or concept found on the internet to invent with, and, in the case of the INVENTOR'S MENU TTT model (with TTT denoting Tic Tac Toe) inventing is made a very easy, quick, and fun process.

Because the inventor's menus are used with internet art, normally, which is always current (and always will be), the instant invention will always be current.

BRIEF SUMMARY OF THE INVENTION

The inventor's menus are unequaled aids to invention, which can be used by nearly anyone in the world, especially by people with access to the internet, and a web site such as INVENTIVE-INTERNET.COM owned by the inventor of the instant invention although software packages, having the menus art, may be very effective.

Further, they enable anyone, from a child to a scientist, to become inventive or more inventive due to the pioneer methods and menu apparatuses utilized, which make inventing as fun and fast as is possible, yet also as comprehensive and productive as is possible, due to all of the aspects of the instant invention, and, in most cases, the utilization of the massive source of concepts found on the internet, or like means, and the ability, via the menus, to juxtapose almost any internet concept against any concept denoted on an inventor's menu.

The interactive menus enable people, around the world, to be able to juxtapose almost any kind of concept (i.e., words, pictures, symbols etc. or written descriptions of pictures or symbols) in the world against any other kind of concept in the world, via the use of the internet, and its immense source of concepts, to create inventions or prospects for inventions.

The interactive menus provide the most comprehensive inventive tool in history.

The interactive menus provide the most useable inventive tool in history.

The interactive menus provide the most productive inventive tool in history.

The interactive menus provide the current fastest inventive tool.

The interactive menus provide an inventive means which is the most fun to use to invent with.

These and other features and objects will be apparent upon consideration of the following detailed description of preferred embodiments thereof, presented in connection with the following drawings in which like reference numerals identify like elements throughout.

BRIEF DESCRIPTION OF THE DRAWINGS

FIG. 9(a) and 9(b) show 2 different styles of the menu of FIG. 5(a) having all 3 of the open spaces in each vertical column being filled in with words, with the left and right vertical columns showing words from simulated drums or reels after they have been activated, and the center vertical columns, in each case, showing typed in key words. In reading each menu, as described in FIG. 6 various descriptions of inventions and prospects are revealed.

DETAILED DESCRIPTION

Figure 1:
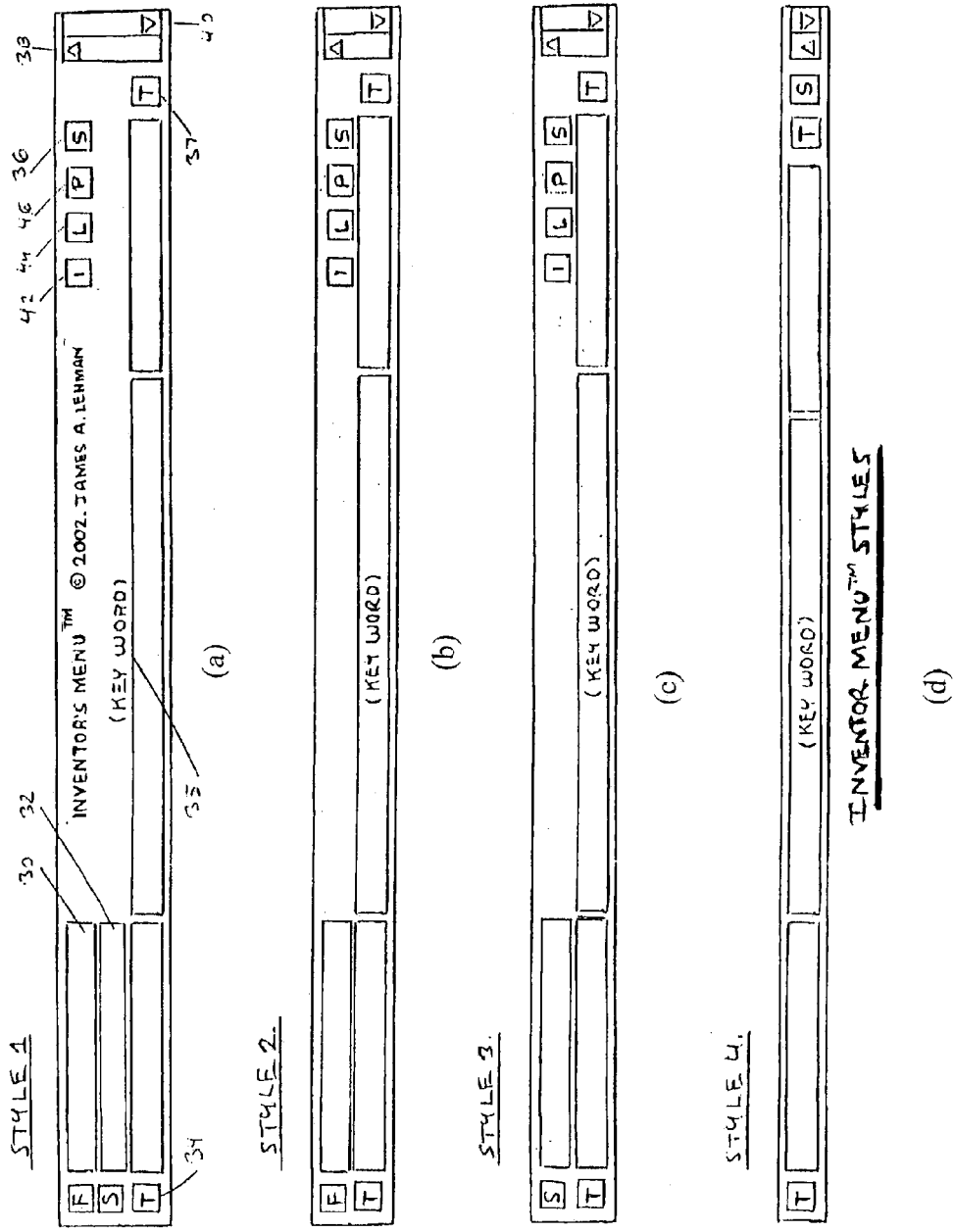
FIGS. 1(a)–1(d) are drawings of menus according to various embodiments of the invention.
Figure 2:
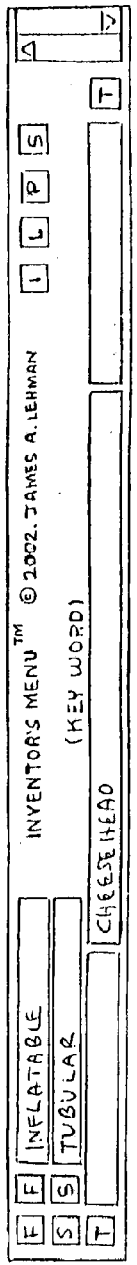
FIGS. 2(a)–2(e) show the menus of FIG. 1 having some of the open spaces on the menu filled in with words from a list of words in separate categories relating to each open space.
Figure 2:
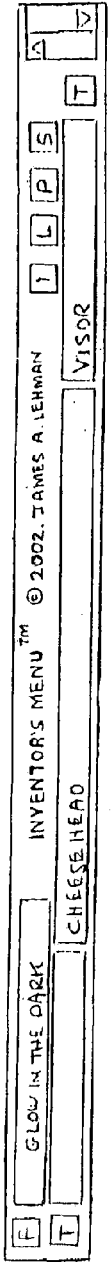
Figure 2:
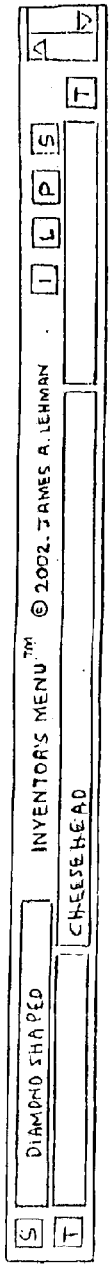
Figure 2:
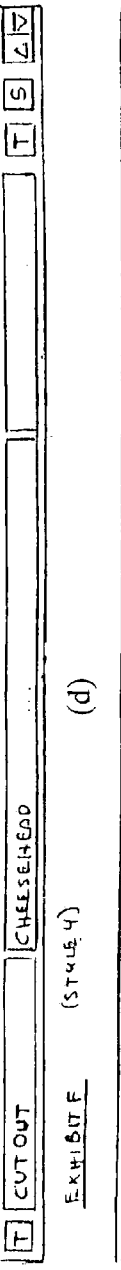
Figure 2:

Interactive menu apparatuses used within software computer and video display systems, of all sorts, for all sorts or uses, have been widely used for quite some time, but none have been developed to use solely as an inventive tool until now, via the 3 Models of the instant invention, the INVENTOR'S MENU.

Further, uses of all sorts, have been developed for using the internet, but none have been developed to use it solely as an inventive tool.

The instant invention combines the use of inventive menus along with internet art to create the most powerful, comprehensive, easy to use, and fun inventive tool.

The drawings provided as part of this patent application, show FIGS. 1–12, which generally depict the inventor's menus utilized in an interactive menu like apparatus and method within a software computer and video display system for creating inventions or prospects for inventions via the juxtaposition of words or concepts displayed on the inventor's menu.

All of the styles of menus shown in FIGS. 1–4 show menus which have the open spaces or cells or slots on the left side of the menu staggered. Normally, however, all of the open spaces or cells or slots. on the inventor's menus, be they on the left or right or in any center position on the menu are directly in line, vertically, in a column.

More specifically, FIGS. 1–12, depict the inventor's menus utilized in an interactive menu apparatus and method within a software computer and video display system for creating inventions or prospects for inventions via the juxtaposition of words or concepts displayed on a menu anywhere on the video display system. The menu apparatus is comprised of a one space to thirty space open cell or window grid above, below, or alongside a line or lines of command icons on the menu, normally on the non open heading of the menu or on a non open area on the sides or at the bottom of the menu, used for creating inventions or prospects defined by the word or concept paths or sets shown through the singular or multi open spaces on the grid from normally one to six simulated rotating drums or reels normally below the open spaces on the menu apparatus, which is a normally rectilinear, simulated cover, having lines separating the individual open spaces provided in front of said simulated rotating drums or reels. Each drum or reel has a plurality of words of an individual category or concepts on it. The one to six drums or reels are spun, briefly, to randomly generate a set of words or concepts viewable through the open spaces, which juxtapose in some direct line or skipping fashion, in any order, to define an invention or prospect based on the outcome of the randomly generated word paths or sets which are shown on the inventor's menu.

Finally, in this regard FIGS. 5–9 depict a specialized inventor's menu (the INVENTOR'S MENU TTT) utilized in an interactive menu apparatus and method within a software computer and video display system for creating inventions or prospects for inventions via the juxtaposition of words or concepts displayed on a menu anywhere on the video display system. The menu apparatus is comprised of a nine space open cell or window grid, which may be above, below, or alongside a line or lines of command icons on the menu.

Figure 10:
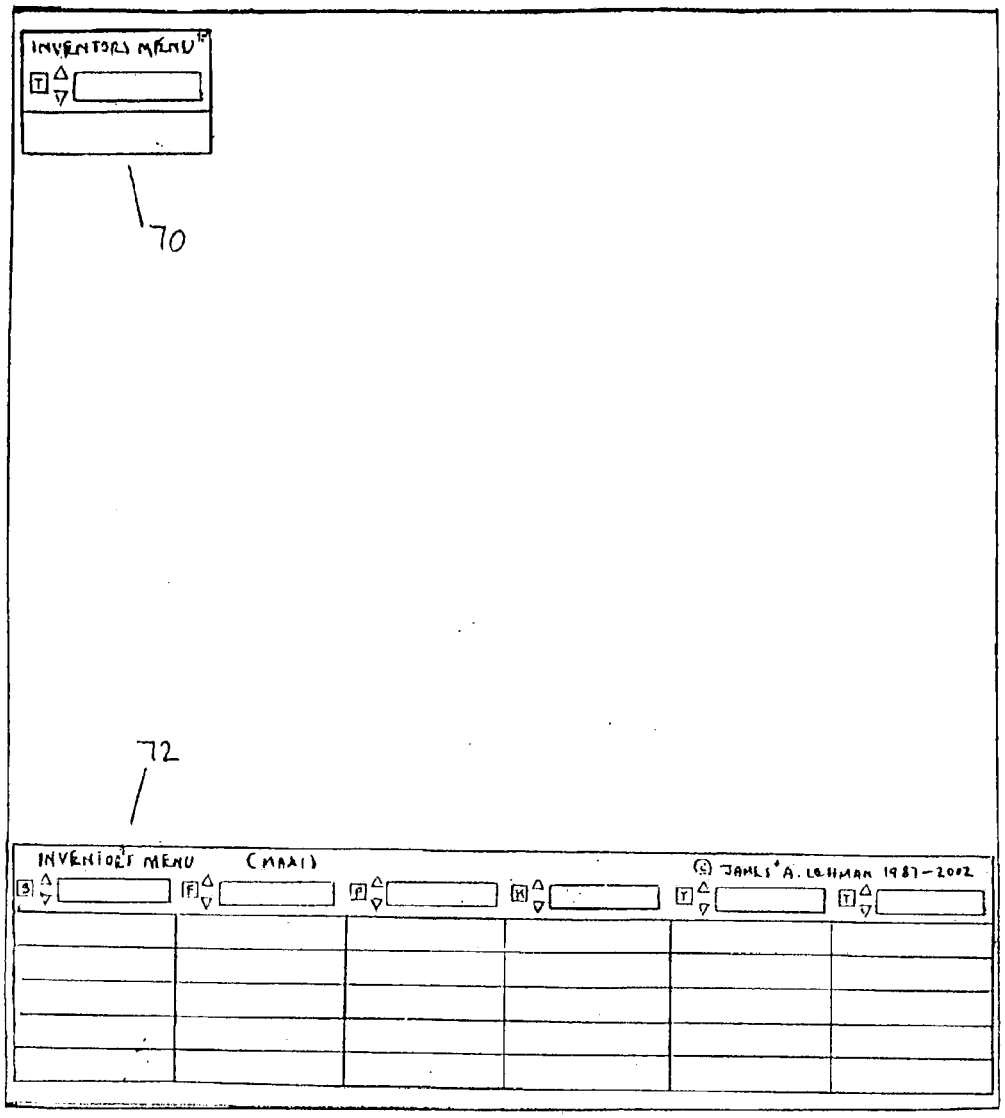
FIG. 10 shows examples of menus according to embodiment of the invention on a video display or terminal screen.

A menu like apparatus of FIG. 10 is shown wherein words or concepts, usually key words or list words, and usually from the authors copyrighted creative works, but sometimes from any word or description in words or a concept, shown on the internet or like means or sometimes from a persons mind, typed in over the 1–30 space open cell or window on the grid on the menu. Words from lists, indexes, articles, or from descriptions of pictorial depictions being very useful in the inventive process.

A menu like apparatus of FIG. 5(a) is shown wherein words or concepts, usually keywords or list words, and usually from the authors copyrighted creative works, but sometimes from any word or description in words of a concept, shown on the internet or like means or sometimes from a persons own mind, may be typed in over the 9 space open cell on the grid on the menu. Words from lists, indexes, articles or from descriptions of pictorial depictions being very useful in the inventive process.

A menu like apparatus for creating inventions or prospects for inventions via the juxtaposition of words or concepts is shown in FIG. 10, wherein one to five rows of words or concepts from the drums or reels are aligned in a horizontal plane on the menu as seen through its open, lined, spaces, cells or windows.

A menu like apparatus for creating inventions or prospects via the juxtaposition of words or concepts is shown in FIGS. 1 and 5(c)–5(f) three rows of words or concepts from the drums or reels are aligned in a horizontal plane on the menu as seen through its open, lined, spaces, cells or windows.

A menu like apparatus for creating inventions or prospects via the juxtaposition of of words or concepts is shown in FIG. 5(a). One to six rows, or columns, of words or concepts from the drums or reels are aligned in a vertical plane on the menu as seen through its open, lined, spaces, cells or windows.

A menu like apparatus for creating inventions or prospects for inventions via the juxtaposition of words or concepts of FIG. 5(a). Three rows or columns of words or concepts are aligned in a vertical plane on the menu as seen through its open, lined, spaces, cells or windows.

Each drum or reel having a plurality of words or concepts are shown in FIG. 5(a), wherein the words, if taken from the authors copyrighted or patent applied for creative works, and any part thereof, especially from any index part of the work or if it is constructed by the user of the menu, are arranged from A-Z, and usually are grouped in a separate category for each wheel, usually in things, function & miscellaneous, and shapes categories.

The simulated rotating drums or reels of Model 3 is shown, wherein the reels or drums comprise; a singular rotating drum or reel or 2–6 rotating drums or reels adjacent to each other having a outer surface on which a plurality of words or concepts are shown, which is rotatable around an axis; a rotation control means for controlling rotations of said singular or 2–6 rotating reels or drums, separately.

The simulated rotating drums or reels of Model 2 is shown, wherein the reels or drums comprise; a first rotating, center, drum having an outer peripheral surface on which a plurality of words or concepts are shown, which is rotatable around an axis; a second rotating drum having an outer surface on which a plurality of words or concepts are shown, which is arranged adjacent to one side of the first rotating drum and rotatably around said axis; a third rotating drum having an outer peripheral surface on which a plurality of words or concepts are shown, which drum is arranged adjacent to the other side of the first, center, rotating drum and rotatably on said axis; a rotation control means for controlling rotations of said first, second, and third drums, separately.

A menu like apparatus of Models 1 and 3, wherein, a line or lines of command icons on the menu normally on the non open heading of the menu or on a non open area on the sides or at the bottom or top area of the menu, wherein the standard arrangement of command icons for controlling the 2–6 simulated rotating drums, each having a plurality of words, and each with an individual category of words, would be, from left to right: (1) shapes category icon controlling the first reel or drum and its random spins, (2) function & miscellaneous icon, controlling the second reel and its random spins, (3) prospect icon, with prospects being typed in or deleted, in conventional computer fashion, over the open spaces, cells, or windows over the third reel or if no prospects are typed in, the second reel would be used and activated or spun and used in the same fashion as the things reel and would show things, (4) key word icon, with key words being typed in or deleted in conventional computer fashion over the open spaces, cells, or windows over the fourth reel or if no key words are typed in this reel would be activated or spun and used in the same fashion as the things reel and would show things (5) things category icon, controlling the fifth reel and its random spins, and (6) another things category icon, controlling the sixth wheel and its random spins, for example to activate the brief random spin of the first reel, wheel, drum or however described the user would click on to the "R" or random icon and then the "S" or shapes icon, and to activate the second reel the user would click on to the "R" or random icon and the "F" or function and miscellaneous icon, and to activate the third reel the user would click on to the "R" or random icon and the "P" or prospect icon to produce a list of things, and to activate, and to activate the fourth reel the user would click on to the "R" or random icon and "K" the key word icon to produce a list of things, and to activate the fifth reel the user would click on to the "T" or things icon to produce a list of things, and to activate sixth reel the user would click on to the "R" or random icon and "T" or its things icon, and, in all cases, each icon for each reel would have a set of up/down scroll icons adjacent to it for slowly scrolling up or down the entire list of words in the category, accomplished by clicking on either the up or down icon, and after proceeding in the direction indicated clicking, again, to stop the scroll.

The menu of 1–6 reels or drums, wherein the largest menu would be ideal to develop prospects for inventions, and the smallest would be ideal for use on a crowded screen or as a way to leave the one reel, one category cell, and one open space cell or window menu on the screen at all times, and when the user thinks of it he may juxtapose the word shown on the smallest menu against what ever of the many words or concepts may also be shown on the screen, and thus often create unusual ideas.

Regarding command icons, there would be a line of command icons on the menu normally on the menus open heading of the menu or on a non open area on the sides or at the bottom of the menu of model 2, wherein the standard arrangement of icons for controlling the simulated tic tac toe like reels or drums, and their plurality of individual category words, would be the following: (1) things category icon, controlling the left reel or drum and its random spins, (2) key word icon, with key words being typed in or deleted in a conventional computer fashion over the open spaces, cells, or windows over the center reel or if no key words are typed in the center reel or drum it would be activated or spun and used in the same fashion as the things reels or drums or reels showing things at the left and right of the center reel, (3) the random icon, used to activate the spin of all of the reels or drums in conjunction with the individual reels category icons and, (4) things category icon controlling the right reel or drum and its random spins, for example to activate the brief random spin of the left reel or drum the user would click on to the "R" or random icon and then the "T" or things icon on the left side of the menu, and to activate the brief, random, spin of the right reel or drum the user would click on to the "R" or random icon ant then the "T" or things category icon on the right side of the menu, and to activate the spin of the center reel or drum, not having key words typed in over it on the menu, the user would click on to the "R" or random icon then "K" the key word icon.

Further, there would be a line or lines of command icons on the menu on models 1 and 3, wherein the word category icons may be arranged in either a horizontal or vertical line or a combination of such lines, in any fashion.

Finally, regarding the inventive interactive menu apparatus of models 1 and 3, wherein the components cited may be of any configuration, number or combination, and each model many be identified by an individual number or alphanumeric identification so that each may be pulled up from software by clicking on to the specific, individual, number or alphanumeric identification designating the model to be used on screen.

And, regarding an inventive, interactive, tic tac toe like menu apparatus and method of model 2, wherein the apparatus and method may be utilized on any kind of non computerized, game or teaching, mechanical or literary or pictorial or any such combination.

Model 1. (FIGS. 1-4)

To create a new idea, invention or prospect using the interactive, menu apparatus and method within the video display system of the instant invention this inventors menu is superimposed at the bottom of any kind of screen on any type of computerized device having a screen, which normally is connected to the internet, and its displayable art.

Figure 3:
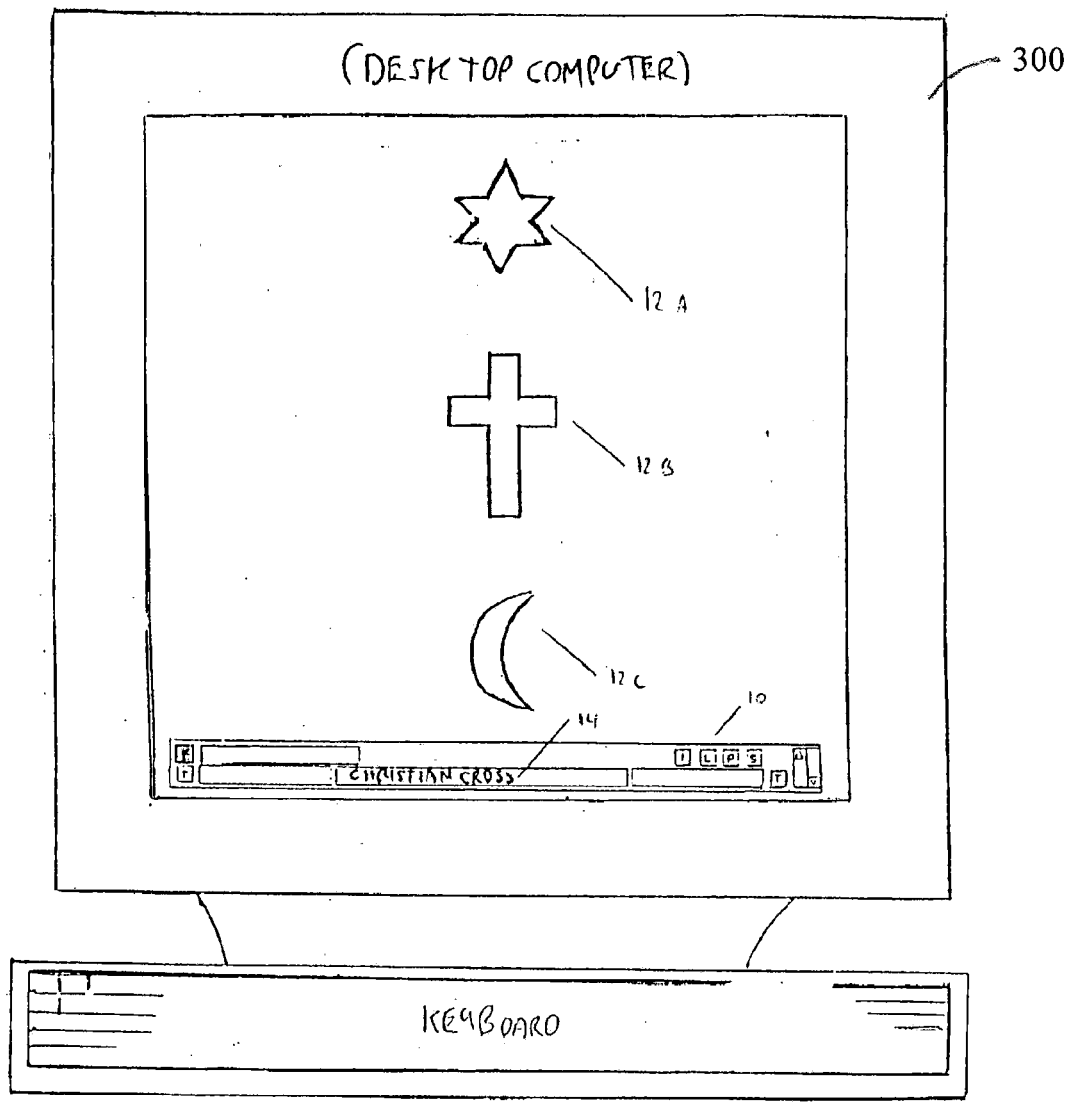
FIG. 3 is a drawing of the menu of FIG. 1(b) on a screen of a desk top computer display having religious symbols displayed from a web site on the internet.

For example, FIG. 3, shows the Style 2 menu, 10 (FIG. 1(*b*)) on the screen of a conventional desk top computer 300 having internet art (religious symbols, 12*a*, 12*b*, and 12*c*, in this case) and a situation where the user typed in CHRISTIAN CROSS, 14, as the key word or key concept to be used to juxtapose against other words or concepts on the Inventor's Menus (in most cases the words on lists developed for the menus and part of the software are more than adequate) or against any art (word, concept, symbol, picture) found anywhere on the internet or in the users mind to produce the invention via the juxtaposition of concepts.

In this case, the Inventor's Menu 10 is shown below the internet art, with a matrix of four open space cells or slots on the menu, but a number of differently configured menus may be located anywhere on any video display screen, on the bottom, top, sides etc., and the menus may be comprised of many differently configured open space grids (with one open space generally used for the entry of typed in words or concepts to work with, specifically a key word or key concept described in words) for showing words from a variety of sources, lists, mostly) and icon arrangements down to menus or portions of menus having only one key word, and open space cell, on the smallest menu possible.

Figure 4:
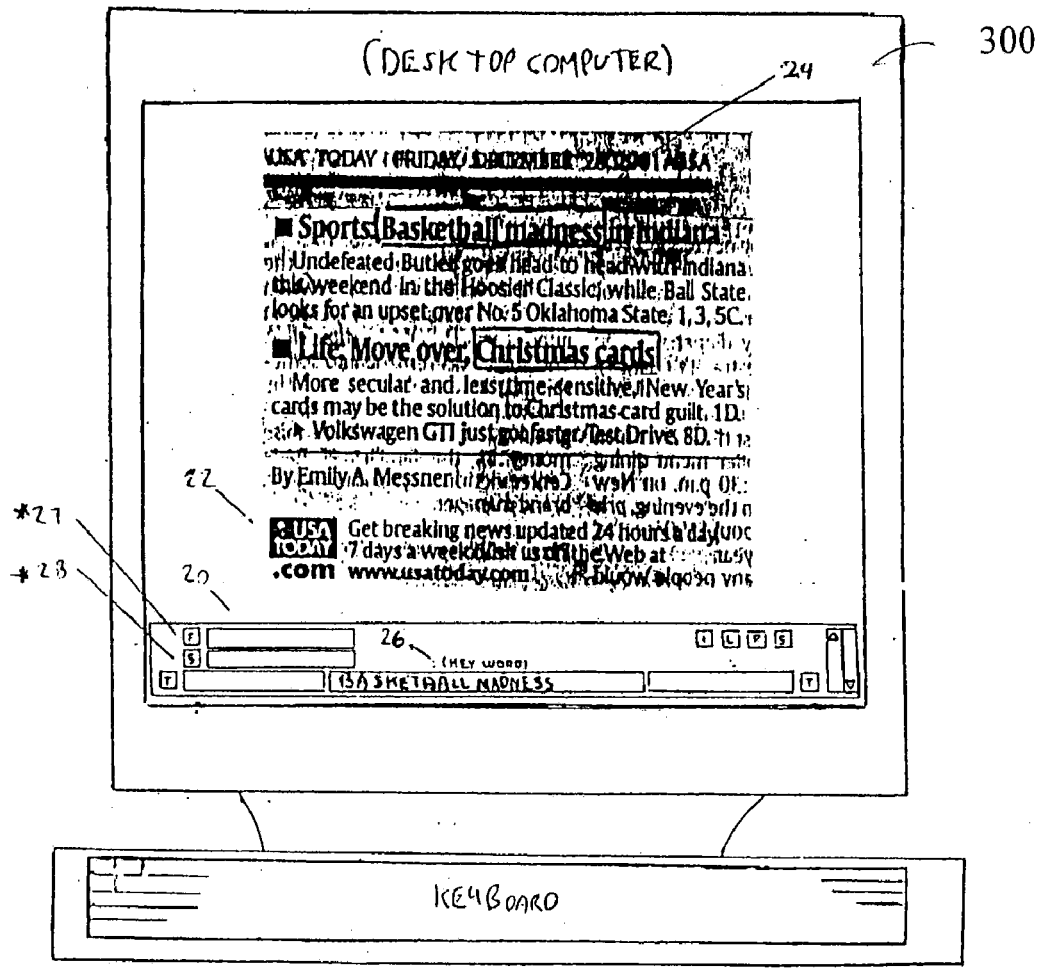
FIG. 4 is a drawing of the menu of FIG. 1(a) on a desk top computer display having a newspaper article taken from a web site.

FIG. 4 shows the Style 1 menu, 20 (of FIG. 1(*a*)) on the screen of a conventional computer 300 having internet art from the USA Today newspaper, 22, and a miscellaneous section showing BASKETBALL MADNESS, 24, as a good key word or key concept to work with in inventing, and was typed in as the key word, 26, in the open space cell, at the bottom of the line of open space cells located on the menu.

Note: new products or exotic concepts are often good candidates for key words or key concepts to use to develop improvement inventions.

Further, almost every new invention has a possibility of being used to develop a new invention, by making it a key concept or word and inventing in the matter spelled out in this patent application which essentially allows for developing ways to add a new feature or function or shape to the new invention to make yet another new invention. Also, new inventions can be broken down to their components or features or functions and those individual components or features or functions can be made key concepts or key words and be processed accordingly.

The design of the Inventor's Menus are capable of listing any kind of word or concept used in the inventive process from word or concept lists either of the users own making or lists found anywhere or from the lists that are part of the Inventor's Menus software or by defining almost any kind of non word concept, with words, and then juxtaposing that concept or the words, on the menu, itself or against the words or concepts on the internet, or both ways, thus making the Inventor's Menus the greatest inventive tool, ever, which can never be exceed.

Specifically, to use the Inventor's Menu of FIG. 1(a) you:

First type in a key word in the cell or slot provided, which you obtain from the INVENDEX t.m. (a book written, years back by the inventor of this invention) lists (which are normally part of the software of the Inventor's Menus) or from your own mind or from anywhere on the internet (you do not have to limit yourself to the words you find because you can type in a description of anything you see on the internet, be it a picture or symbol or what ever).

Then to juxtapose your key word with other words or concepts to create ideas, or inventions or prospects you decide which category of words, taken from the INVENDEX t.m. (things, function & miscellaneous or shapes) you want to work with.

Please note that with this model of the Inventor's Menu the open spaces, or cells or slots have icon F (for function and miscellaneous words, from the INVENDEX t.m.) and icon S (for shapes, from the INVENDEX t.m) and icon T (for things, from the INVENDEX) and has all of those open spaces cells or slots directly aligned, to the far left side of the menu and in a vertical line).

Then to show the first word of the list you will work with click on to either icons, F, 30, for function & miscellaneous words, S, 32, for shape words or T. 34, for words that describe things (all of which will be positioned ahead, or before) what ever key word you may use in the open cell or slot, 35, which is located on the center of the bottom horizontal line of cells or slots on the menu. Please note there is another cell or slot, 37 on the right end of the series of open cells or slots at the bottom of the menu.

Then to juxtapose the entire list of the category of words you are matching against your key word or key concept click on to the S icon, scroll, 36, in the fourth box in the line of icons at the top, right, side of the menu, and to control the speed of the scroll click on to the arrow icons, 38 or 40 (away from the point of the arrow for the fastest scroll) and choose the upward pointing arrow to scroll up or the downward pointing arrow to scroll down the list of words in the category words you use, which are shown through the open spaces or cells or slots used (from simulated rotating reels or wheels having the list words denoted on them). Then search until you find a category list word which matches with your typed in key word to create an invention (the key word in this instance being CHEESEHEAD, a new fad awhile back which was easy to improve via the teachings of the Inventor's Menu's).

When you do find a combination of a list word and the key word that you like as an invention click on the I, invention icon, 42, to store that idea, and after you have a number of inventions you may click on to L, list icon, 44, to review your list of inventions. You may then click on to the P, print icon, 46, to print your list of inventions.

Thereafter, you may select any or all of the other category lists of words to work with to further improve or expand your denoted idea or prospect or invention, again following steps 2–5 until you come to an invention (or what ever) made up of your key and the maximum of 3 additional different types of words (from the things, function & miscellaneous, and shapes lists) positioned on the menu either before or after the key.

Styles 2, 3, and 4 (shown in FIGS. 1(b), 1(c), 1(d), respectively) proceed downward in their capability to match the categories of list words with a key word, with Style 4 being the least capable, again, see FIG. 3. Finally, in this regard, FIGS. 2(a)–2(e) show examples of inventions or prospects developed on the different styles of the Model 1, by the alignment of words which produce/define different types of improved cheesehead products.

Model 2. (FIGS. 5(a) and 5(b)

The Model 2, known as the INVENTOR'S MENU TTT t.m. (with TTT denoting, Tic Tac Toe) is an upgraded version of Model 1. (known as the original INVENTOR'S MENU t.m.) and is identified in this patent application as Styles 5-A and 5-B, which are the primary preferred embodiments.

This style menu, like the Model 1 styles, is normally used oil a video display terminal or screen having internet. But, it may also be used on any kind of game, including pay to play arcade games, which utilize software and a screen and a control means. And it may be varied to be used as some sort of slot machine of any kind. Also, the art may be incorporated into a variety of computer software products.

This interface menu, with its ability to enable the user to quickly juxtapose nine different words or concepts on a familiar Tic Tac Toe configured grid on a menu apparatus, and with its capacity to add new words or concepts to the mix, makes this tool the fastest, and currently the most powerful inventive tool.

Figure 5:
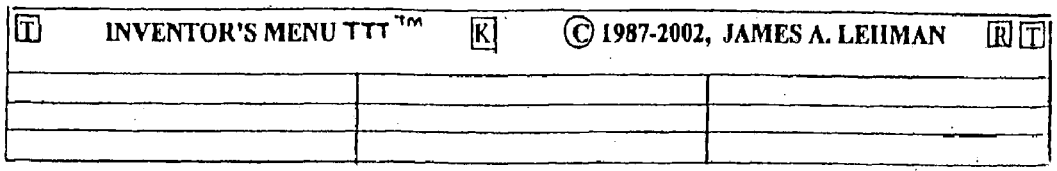
FIG. 5(a) and 5(b) are drawings of menus referred to herein as the INVENTOR'S MENU TTT (Tic Tac Toe) Model 2, which has the classic direct vertical alignment of the open spaces or cells or slots, and, the direct horizontal alignment of the open spaces or cells or slots.
FIGS. 5(c)–5(f) are drawings of menus according to various embodiments.
Figure 5:
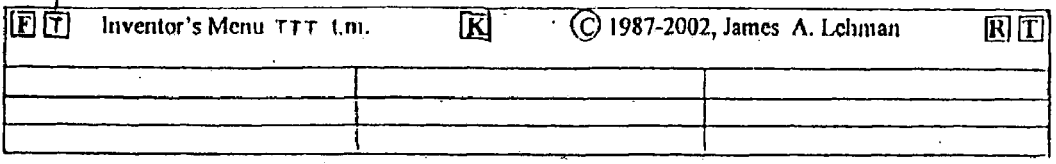

This menu ( FIGS.5 (a) and 5(b)) generally consists of an interface software, Tic Tac Toe style, inventive game having three, simulated, spaced wheels or reels with words (or concepts) on them (from the inventor's book the INVENDEX t.m. or from other lists from books etc. written by the inventor of the instant invention) as they appear on a video display terminal or screen having the menu (with nine, see through, recit-linear open spaces or cells) superimposed over them.

No physical wheels are utilized in the spinning of the wheels (which also is a simulation) and the seeming spinning of the wheels just appears to be that from the way the software displays the art of the wheels through the viewable open spaces of the menu the wheel or reels through the viewable open spaces or cells on the menu, with its nine open, rectilinear (in this instance) spaces or cells (forming a tic tac toe configured grid) positioned above the simulated wheels or reels (note: in an alternative embodiment the wheels my be actual, mechanical, wheels having words denoted on them).

Each simulated wheel shows three words through the three open spaces on the menu column which they are directly aligned with so that the three wheels will show nine words through the nine menu open spaces after the wheels have been activated (or 3 words per wheel shown behind the 3 columns of open rectilinear spaces).

With this model of the menu all nine of the open spaces on the grid may be used to type in other words by moving a curser to each space and typing in words of the users choosing, and then, as desired, removing the typed in words by deletion or backspacing leaving the spaces to show only the words that would otherwise show from the wheels through the open spaces. When this type in function is used the open spaces would automatically be provided with a background so that the words from the wheels or reels would not show through.

In any event, at most times there would be nine words (hereafter concepts will not be added) which could be used to invent with to produce product descriptions via the juxtaposition of the words shown (in a tic tac toe manner) with normally three words aligned either vertically, horizontally, or diagonally as in a tic tac toe game, with the word paths or lines beginning from either end of the line (as in tic tac toe) or in any manner which the arrangement of three columns of three words would allow (in a series of two to nine words, normally) which could also involve skipping spaces in a word path which would describe an invention using a "bouncing around" manner of any kind. (organized or random) in other words utilizing the nine displayed words in all the combinations which would be possible mathematically. Meaning that just one set of nine words (which can be produced, in seconds, over and over again) would be an extremely potential source for words/concepts to invent with, and invention is all about the matching of words or concepts.

The style 5 menu is used by spinning (activating) the wheels on the left and right side of the menu, and when they come to rest juxtaposing the words displayed through the open rectilinear spaces of the menu against the key words displayed (typed in) on the center column of spaces on the menu (in continuing lines) with the word paths (which may describe an invention) starting from either end of the line. And, to be candid, most inventions produced will probably involved only two words.

In reading the combinations of words produced by the activation of the 1–3 wheels (or just the left and right wheel, plus the key word{s} entered on the center wheel) the approach is to take one word (usually the key word or KEY) and match it with another word that is directly adjacent to it (above, below, alongside or diagonally) until an invention is defined by two words or a series of words, up to nine words (shown in the nine rectilinear spaces after the activation of the wheels) through a series of nine words describing an invention would be extremely rare.

Regarding the center wheel and its column of three words it should be noted that indeed words may be typed in the rectilinear spaces, and if they are each typed in, the words would be superimposed over the list of words otherwise shown through from the center wheel (with said words being in this case taken from the inventor's work INVENDEX t.m.) but which may be taken from any of the inventor's copyrighted words or from any list or index or the like from anywhere). Thereafter, to remove the typed in words normal computer functions, like "delete" and "backspace" are used.

If words are not typed in all of the three spaces in the center column then the list of "things" (again, from the INVENDEX t.m. NOTE: in all instances in this disclosure, the list words on all of the wheels are taken from the INVENDEX t.m., and with the Style 5-A of FIG. 5(a) all of the words are "things" and with the Style 5-B of FIG. 5(b) the right two wheels have "things" but the left wheel has function and miscellaneous words taken from the INVENDEX t.m. normally found on the center wheel could be displayed by clicking on the "R" or Random and then "KEY" icons to activate the lists (NOTE: all reels or wheels, once activated, move at different speeds after each activation, resulting in a different 3 word set of words on each wheel being displayed in the rectilinear spaces each time, so as to provide a great variety of words to match "work with" after all three wheel, or even two wheels have stopped, which happens after a brief period of time) or "spin them" (meaning the list of words are displayed past the open rectilinear spaces in a top to bottom sequence, normally, However, in an alternative embodiment words may be made to appear "one at a time" in any sequence in the 9 space grid or at the same time via a non spinning wheel, software, function.

To activate the spin of the left wheel, in the menu of FIG. 5(a), the operator would click on the "R" or Random box (icon) and then the "T" (Things) icon at the left side of the menu (Things, again, taken from the INVENDEX t.m.).

To activate the spin of the right wheel (or column of words or concepts) in the 5-A the operator would "click on" to the "R" or Random icon and then the "T" icon on the right side of the menu.

When using the Style 5-B menu the only difference in the operation would be the use of the Function & Miscellaneous words, which would be displayed on the left wheel and through the left side of open spaces on the INVENTOR'S MENU TTT t.m., by first clicking on to the "R" icon and then the "F" (or Function & Miscellaneous words) icon at the left of the menu.

To produce possible inventions or prospects the menu also allows the option of spinning a choice wheel (or reel) again, and again, to induce interactive plays until an invention or prospect is produced, which normally would not take to long (what other inventive method can claim that) unless you use a Key Word that denotes an old concept, which has been improved endlessly, leaving little room for other improvements.

Referring, again, to the menu of FIGS. 5(a), 52 (of FIG. 5(b)) and the menus 53, 54, 55, and 56 of FIGS 5(c)–5(f), respectively, and a three space opening on the menus, all of which operate in the same fashion as the preferred embodiment, but have less capability but take up less room on the screen, which may be beneficial in some instances. Note: the menu 52 may have an optional Things icon, 57 as shown in FIG. 5, so both Things and Function & Miscellaneous may be juxtaposed on one screen menu.

Figure 6:
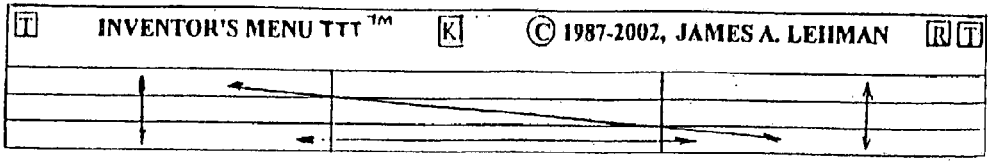
FIG. 6(a)–6(d) show 4 examples of various word paths or lines which may produce descriptions of inventions or prospects by reading the words shown through the open spaces of the menu of FIG. 5(a).
Figure 6:
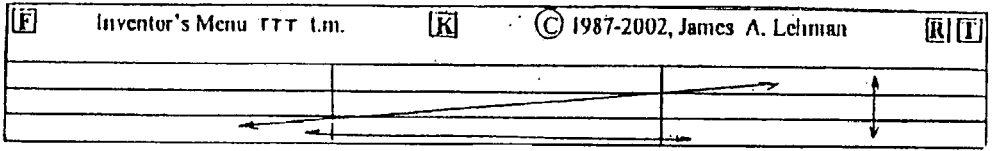
Figure 6:
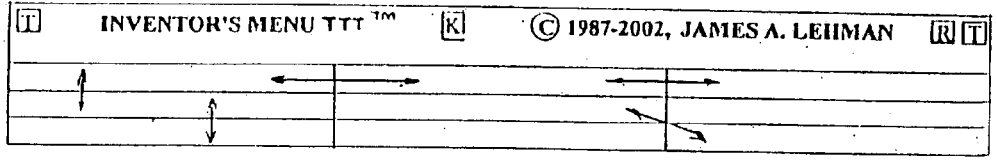
Figure 6:
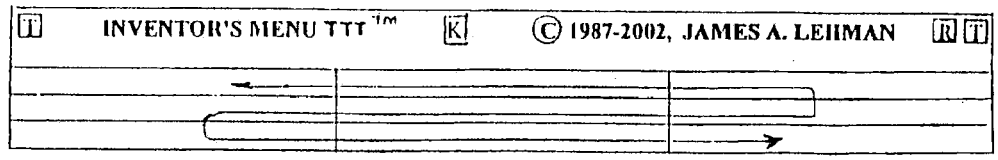

FIGS. 6(a)–6d) show some of the many ways in which a series of words, taken after activating the wheels, may be aligned to produce inventions via juxtapositions and words paths, from a two word series to a nine word series (menu 60 of FIG. 6(a) shows examples of 3 word series, vertically, horizontally, and diagonally, in classic Tic Tac Toe configurations. Menu 61 of FIG. 6(a) is essentially the same as 60 except it does not show any vertical alignment of words in the left columns, because Function & Miscellaneous words (see the F icon shown on 61) combined by themselves, are meaningless. 62 shows examples of two word series which can create inventions by horizontal, vertical or diagonal word paths. 63 shows an exotic example of a nine word series word path possibly defining an invention, but that would be a very rare occurrence. It must be noted the word paths do not have to be in a direct line and a random, bouncing, pattern may be quite successful. Note: as you can see, the variations shown in II of FIG. 6, do not show any vertical alignment of words, in the left columns, because combinations of Function & Miscellaneous words by themselves are meaningless.

Figure 7:
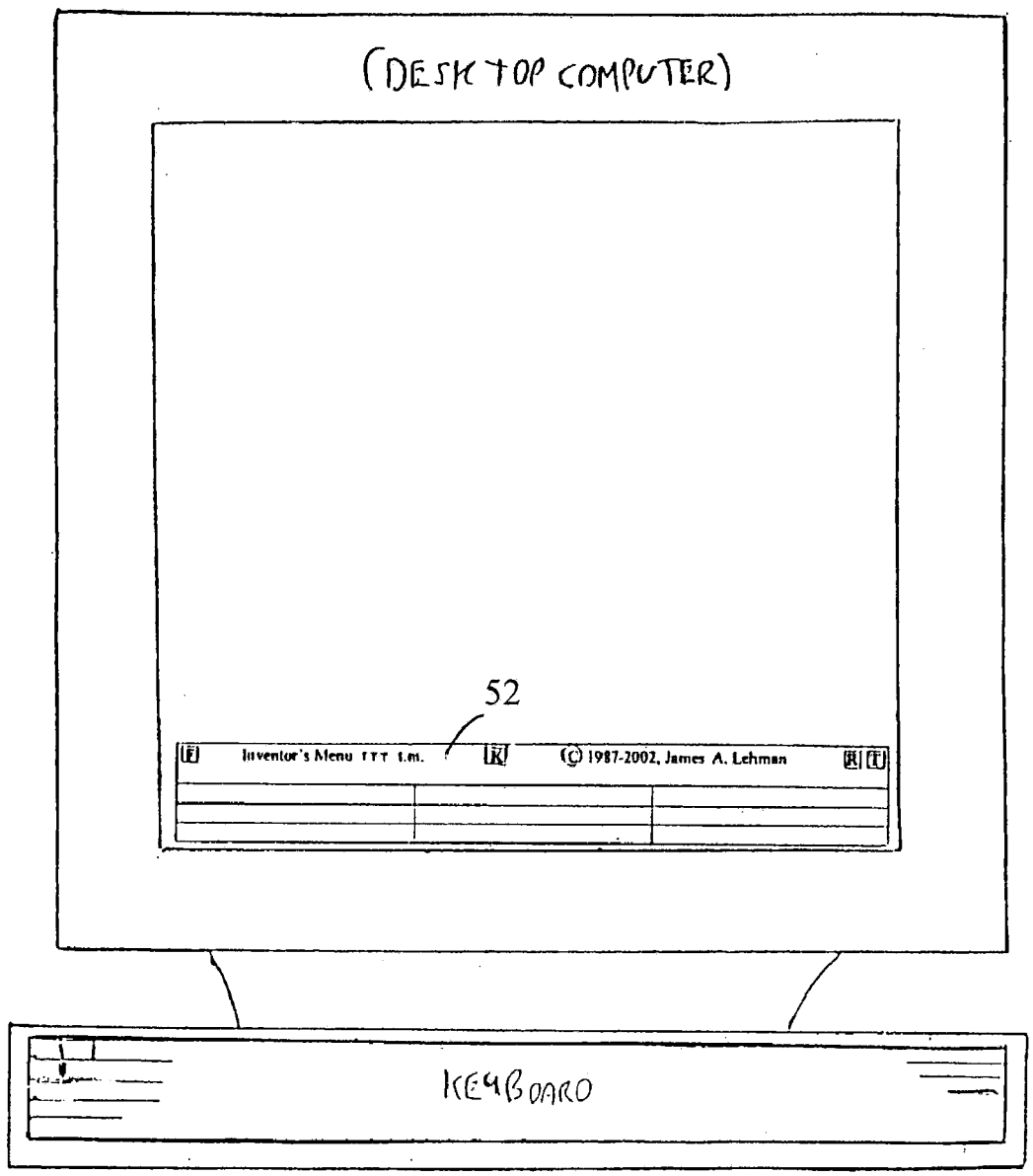
FIG. 7 shows an example of the menu of FIG. 5(a) superimposed over a desk top computer display, either over internet art, or with the menu being used by itself.

FIG. 7 shows how the menu 52 of FIG. 5(b) would look superimposed over a desk top computer screen or almost any screen on which it may be displayed, which may have internet art or art of any kind of other art displayable meaning that any word shown on the menu can be juxtaposed/matched against any word, picture, symbol etc. shown on the screen above the menu. Obviously, the menu can also be used, by itself, or with any screen art shown.

Figure 8:
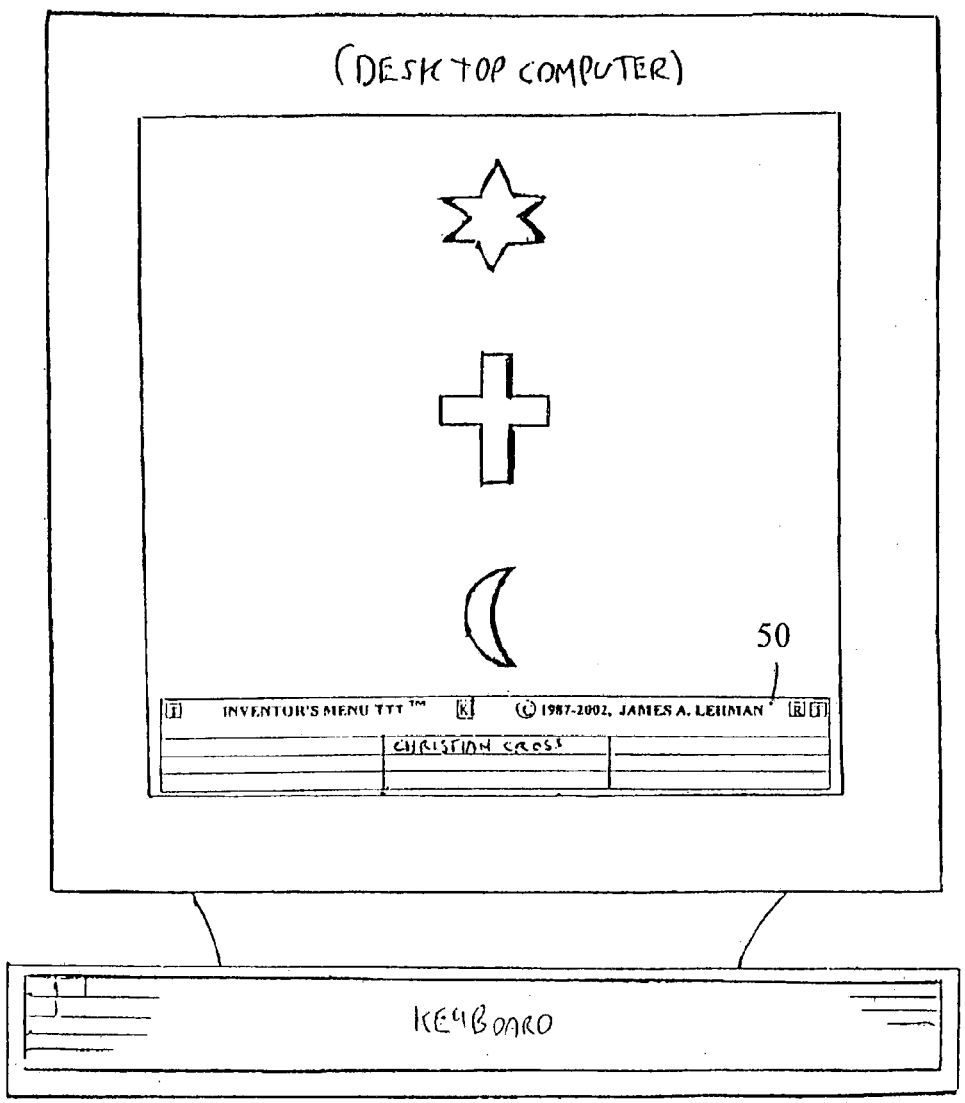
FIG. 8 shows the menu of FIG. 5(a) superimposed over internet art on a desk top computer display.

FIG. 8 shows how the menu 50 of FIG. 5(a) would look like over a desk top computer screen or almost any type of screen on which it may be displayed, which may have internet art or any kind of art displayable—but, in this case had internet art showing religious symbols. So, in this case, the menu may be used "as usual" or the description of the art (not otherwise defined by words) may be typed in on the center column of the menu (such as a picture of a Christian Cross) being typed in as a Key Word (or KEY) and then be juxtaposed, as usual, to produce inventions or prospects.

FIGS. 9(a) and 9(b) show actual samples of some series of words (or word paths) produced with the Style 5-A and 5-B menus, which would constitute inventions or prospects.

In FIG. 9(a), the menu has cheesehead typed in on all three center column spaces the following inventions or prospects are produced: Sitter Cheesehead, matching the top, left column, space entry with any of the center column space entries, all the same). Six Gun Cheesehead & Six Pack Cheesehead are also produced by the left & center columns.

As can be seen in the top style match-ups other inventions or prospects (Cheeshead Visor, Cheesehead Vitamin, and Cheesehead Vodka) are also produced in this case by center column and right column match ups of words. Note: the many examples of inventions produced in the top example are unusual and only happened because cheesehead is such a good ideal (or hot idea, especially at its beginning) to work with. Many new products or ideas are good candidates for improvement.

Finally, the menu (FIG. 9(b)) which shows a Key Word (cheesehead) typed only in the center location of the center column of spaces, with the top and bottom spaces of that column showing words from the INVENDEX t.m., shows: Infant Cheesehead, and Inflatable Cheesehead as inventions resulting from the match-ups.

Model 3. FIGS. 5(c)–5(f))

The Model 3 Menu, know as the INVENTOR'S MENU, MAXI AND MINI t.m. pertains to expanded and reduced menu configurations and capabilities.

For example, FIG. 10 shows the simplest of these menus, the MINI, 70, at the top of the video display or terminal screen, and the most elaborate, the MAXI, 72 at the bottom. Note: the MINI and MAXI, as well as any INVENTOR'S MENU t.m. can be dragged to any location on any screen having that capability.

Figure 11:
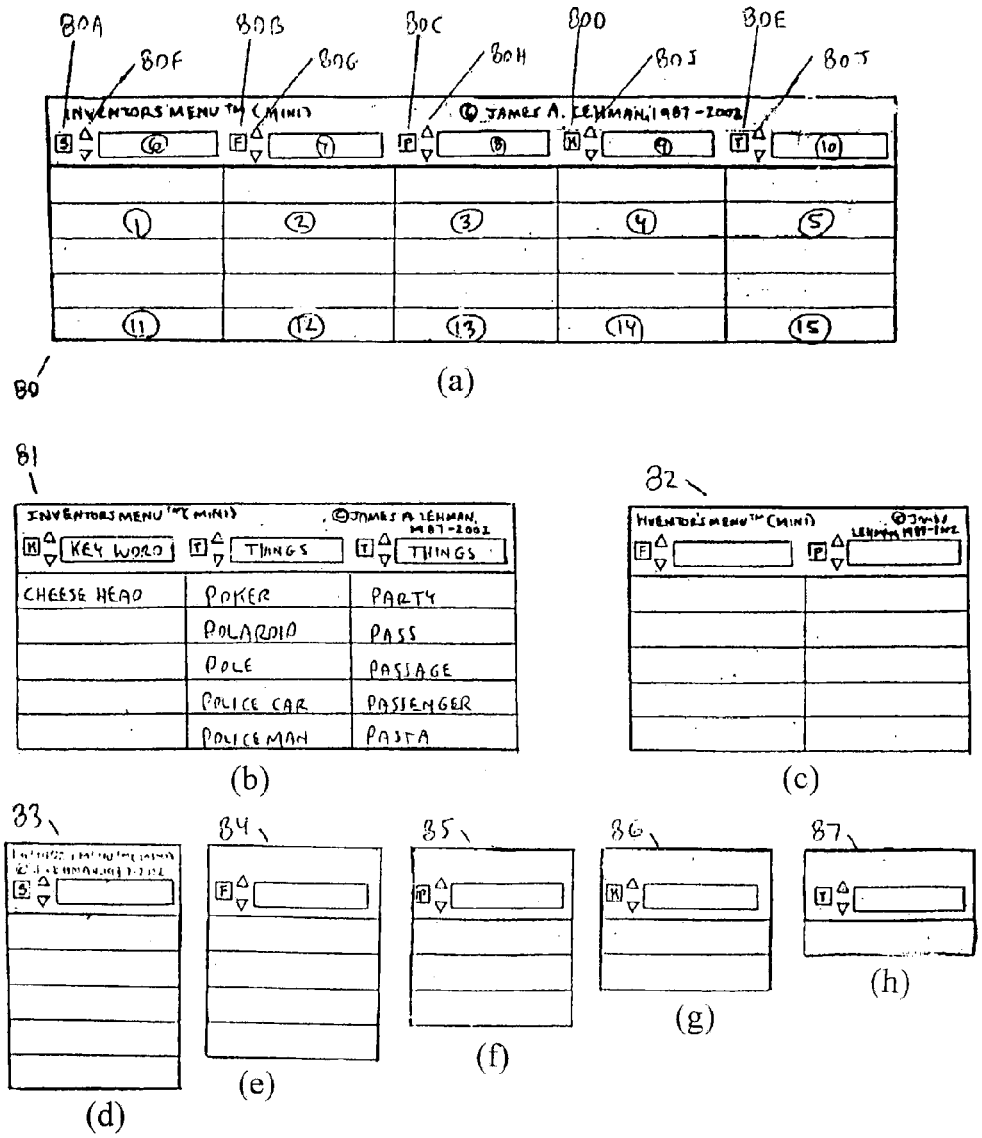
FIGS. 11(a)–11(h) show menus according to various embodiments of the invention.

Specifically, FIG. 11 shows that the MAXI menu may range from having 5 simulated reels/word columns/open spaces/and category cells to 1 simulated reel/word column/open space/and category cell (as seen, the open spaces are located in the word columns) see, 80, 81, 82, 83, 84, 85, 86 and 87.

Menu 80 has 5 simulated reels (see 1–5) with word lists on them (usually from the INVENDEX t.m.) and 5 category cells (see 6–10) which show Things or Function & Miscellaneous or Shape(s) words or Key Words or Prospects categories after the corresponding controlling icon is clicked on to (Note: S denotes Shapes, 80a, F denotes Function & Miscellaneous, 80b, T denotes Things, 80c, P denotes Prospect, 80d, and K denotes Key or Key Word or concept, 80e.

The full word list in the specific category is displayed from the reel through the open space columns (see 11–15) and to move the column of list words on each reel the up/down icons are used (see 80f, 80g, 80h, 80i, and 80j).

It should be noted that Things from the Things list may be scrolled in the Prospect or Key Word columns if a person has no Prospect or Key Word of his own. But, a prospect is usually typed in after the clicking of the P icon, twice, and a Key Word is typed in after clicking on the K twice. Note. menu 81, shows the invention (or prospect) Cheesehead Poker Party, which was created by juxtaposing the key word typed in with list words from the INVENDEX t.m. in two things categories. Also note that a four reel menu was not shown, as not being necessary.

Further, again relating to FIG. 10, a six reel, etc. Inventor's Menu is shown, but more reels, etc. may be part of such a menu.

Also, if the user clicks on a up/down scroll icon the word list will scroll slowly in the direction clicked on to. But, if that icon is clicked, twice, then the word list will spin, for a brief period of time, and come to rest at a random location on the word list in the category used.

Figure 12:
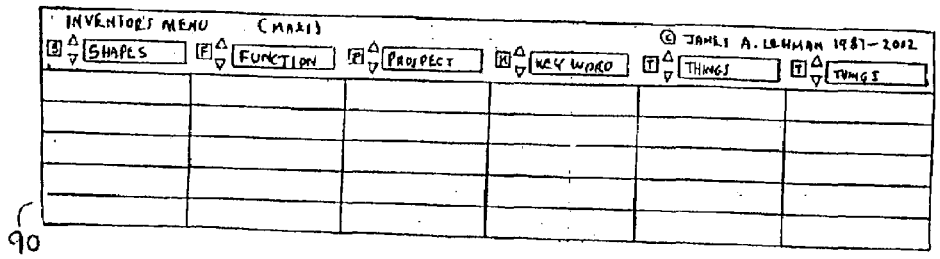
FIGS. 12(a)–(e) show menu according to various embodiments of the invention.
Figure 12:
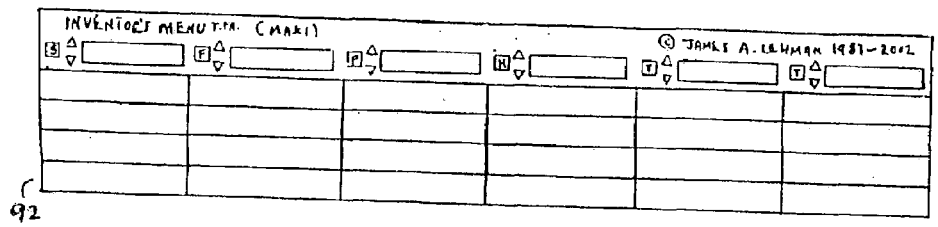
Figure 12:
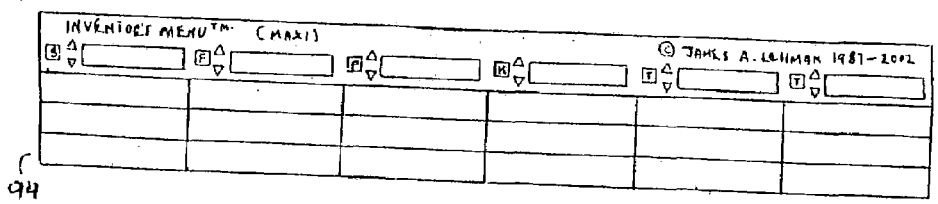
Figure 12:
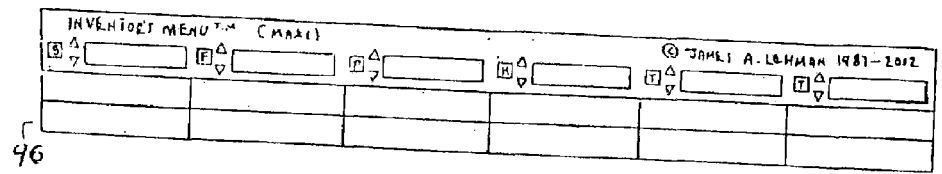
Figure 12:
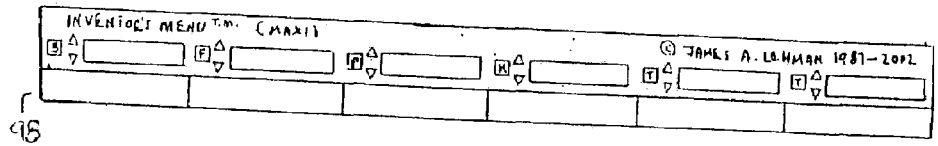

Finally, in this regard, FIG. 12, shows the MAXI which operates in the same manner as the MINI and the other Inventor's Menus previously cited but, is different in that it can range down to a one reel+one word column+one open space+one category cell, usually "things" menu, see 90, 92, 94, 96 and 98.

All of the Models of the INVENTOR'S MENU t.m. may also be used to juxtapose the words or concepts positioned on them not just against each other, to create inventions or prospects, but also against any word or words or concept or concepts found on the internet, or the like, or not or on any kind of literary expression or pictorial depiction or the like, on any video display, with words or concepts from on line catalogs and lists, being very useful in the inventive process.

Regarding the vehicles for accessing the art of the instant invention a user would normally access a web site (INVENTIVE-INTERNET.COM is being developed by the inventor) having any or all of the INVENTOR'S MENU art (and likely all, or much, of the inventors other creative teachings) for free (with sponsors paying for the site) but it is quite likely that a Pay to Use site will also be made available, which should warrant a charge due to the greatness and uniqueness of the site. Also, software packages will likely be marketed. Further, other avenues may be used, like a major search engine or web sites of some major software or computer companies, which may market the art in various way, one variety of the art may be "infrared-ready."

Regarding "the web" many ideal, inventive, tools are currently available on it (and they will only increase, and many will always be current) such as: lists of any kind, be they word lists or pictorial lists etc. from books, catalogs, and publications of all sorts.

So, as an example, to create a new doll, various sites that list: dresses, dress designs, clothing etc., and types and colors of fabrics, and sites that list styles of dolls and or their parts etc. etc. will make creating a new doll concept "a snap." NOTE: an easy way to locate "lists" of any kind is to use Google, and type in "list+the kind of list wanted."

Further, e-literature of all sorts imaginable, will become more and more, comprehensive, and detailed, and complex, making any kind of inventive project easy to handle.

Other variants and embodiments of the instant invention are possible within the spirit and scope of the invention, which is defined by the appended claims.

What is claimed is:

1. A computerized method for facilitating an invention using the Internet, the method comprising the steps of:
   providing a menu to a user on an internet-enabled computer, the menu including at least one field;
   accepting a key element from a user via an input device, the input device being connected to the internet-enabled computer;
   displaying the key element in the field of the menu after the accepting step;
   visiting at least one website on the Internet using the internet-enabled computer to obtain a display of at least a portion of the website on a display of the internet-enabled computer, the portion of the website including at least one website element, the website element being selected from the group consisting of a word, a symbol and a picture;

superimposing the menu over the display of the portion of the website including the at least one website element; whereby the user is presented with a display including an invention prospect formed by the juxtaposition of the website element and the key element displayed in the field of the menu.

2. The method of claim 1, wherein the at least one website element comprises a plurality of website elements.

3. The method of claim 2, further comprising the step of assembling the plurality of website elements by performing a search on the Internet using a search engine.

4. The method of claim 2, wherein the plurality of website elements comprise words.

5. The method of claim 2, wherein the plurality of website ether elements comprise pictures.

6. The method of claim 2, wherein the plurality of website elements comprise symbols.

7. The method of claim 1, further comprising the step of presenting a list of suggested key elements to the user, wherein the key element accepted from the user is selected by the user from the list of suggested key elements.

8. The method of claim 1, further comprising the step of selecting, by the user, a key element from among a plurality of potential key elements identified by performing a search of the Internet using an internet search engine.

9. The method of claim 1, wherein the key element is typed by the user in the menu, the menu having a field text box for accommodating a single word.

10. The method of claim 9, wherein the menu is further provided with a plurality of list icons, each of which function to select a predetermined list of words, a spin icon which, when selected by the user, functions to select one word from a predetermined list of words corresponding to one of the plurality of icons selected by the user, and a key elements icon which functions to enter the word selected by the spin icon into the text box as the key element.

11. The method of claim 10, wherein the plurality of icons comprises a things icon corresponding to a list of thing words, a functions and miscellaneous icon which corresponds to a list of function and miscellaneous words, and a shapes icon which corresponds to a list of shape words.

12. The method of claim 1, wherein the menu has a text box for accommodating a plurality of words.

13. A system for facilitating an invention using the Internet, the system comprising:

an input device for accepting a key element from a user; and an internet-enabled computer connected to the input device, the computer including a browser for displaying at least a portion of a web site to a user, the portion of the website including at least one website element from the group consisting of a word, a symbol and a picture, the computer including a display;

wherein the computer is configured to provide the user with a menu, the menu having at least one field, accept a key element from the user using the input device, display the key element in the field of the menu, and superimpose the menu including the key element over the display of the portion of the website including the website element; whereby the user is presented with a display including an invention prospect formed by the juxtaposition of the website element and the key element.

14. The system of claim 13, wherein the at least one website element comprises a plurality of website elements.

15. The system of claim 14, the computer is further configured to assemble the plurality of website elements through a search on the Internet using a search engine.

16. The system of claim 14, wherein the plurality of website elements comprise words.

17. The system of claim 14, wherein the plurality of website elements comprise pictures.

* * * * *